United States Patent [19]

Eckle

[11] Patent Number: 4,578,003
[45] Date of Patent: Mar. 25, 1986

[54] ARRANGEMENT FOR SUPPLYING COOLANT TO ROTATING CUTTING TOOLS FOR METAL MACHINING, IN PARTICULAR BORING TOOLS, PROVIDED WITH COOLANT DUCTS

[75] Inventor: Otto Eckle, Loechgau, Fed. Rep. of Germany

[73] Assignee: Komet Stahlhalter-und Werkzeugfabrik Robert Breuning GmbH, Besigheim, Fed. Rep. of Germany

[21] Appl. No.: 515,318

[22] Filed: Jul. 19, 1983

[30] Foreign Application Priority Data

Sep. 1, 1982 [DE] Fed. Rep. of Germany ....... 3232495

[51] Int. Cl.⁴ .......................................... B23B 51/06
[52] U.S. Cl. .................................... 408/56; 82/34 R; 408/241 R
[58] Field of Search ............ 408/56, 57, 58, 59, 408/241 R; 82/34 R; 409/134, 135, 136

[56] References Cited

U.S. PATENT DOCUMENTS

| | | | |
|---|---|---|---|
| 3,794,434 | 2/1974 | Woodmansee | 408/56 |
| 4,147,232 | 4/1979 | Gaunt et al. | 408/56 X |
| 4,392,761 | 7/1983 | Eckle | 408/59 |

FOREIGN PATENT DOCUMENTS 3109543 1/1982 Fed. Rep. of Germany ........ 408/59

Primary Examiner—Gil Weidenfeld
Assistant Examiner—Glenn L. Webb
Attorney, Agent, or Firm—Flynn, Thiel, Boutell & Tanis

[57] ABSTRACT

An arrangement for supplying coolant to rotating cutting tools (1) for metal machining, in particular boring tools provided with coolant ducts (2,3), includes a coolant ring (4) arranged rotatably on the tool shank and sealed with respect thereto and having a radially projecting coupling piece (6) provided with a radial coolant bore. On a carrier piece (10) there are provided two intermediate parts (12) arranged at a distance from one another, each of which is swingable at one end (12a) with respect to the carrier piece (10) about an axis extending parallel to the boring tool axis (A), is slidable in a plane extending perpendicular to the boring tool axis (A) and can be clamped with respect to the carrier piece (10), and each of which has at its other end (12b) a bore (16) extending parallel to the boring tool axis (A) for a fixing bolt (17) which can be screwed into a stationary machine part (S). On the carrier piece (10), a holder (8, 8a) is adjustable parallel to the boring tool axis (A), is rotatable about its axis of adjustment and can be clamped in position. On the holder (8, 8a) there is arranged a radially adjustable coupling head (7) provided with a radially extending outlet bore (23) which, on rotation of the cutting tool, can be coupled automatically with the coupling piece (6) with the interposition of sealing means (21).

11 Claims, 9 Drawing Figures

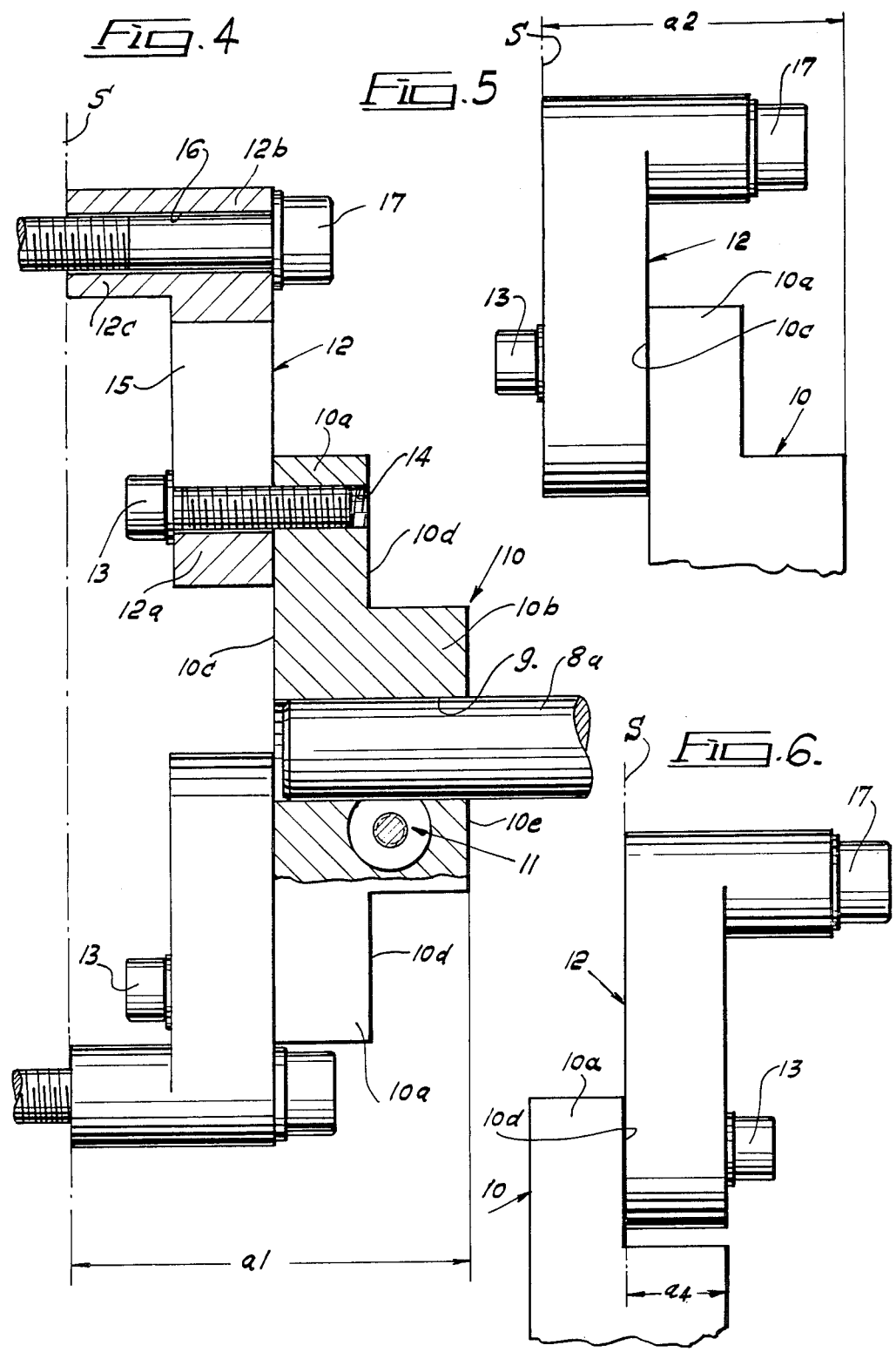

4,578,003

ARRANGEMENT FOR SUPPLYING COOLANT TO ROTATING CUTTING TOOLS FOR METAL MACHINING, IN PARTICULAR BORING TOOLS, PROVIDED WITH COOLANT DUCTS

FIELD OF THE INVENTION

The invention relates to an arrangement for supplying coolant to a rotating cutting tool.

BACKGROUND OF THE INVENTION

The invention relates to an arrangement for supplying coolant to rotating cutting tools for metal machining, in particular boring tools provided with coolant ducts, including a coolant ring arranged rotatably on the tool shank and sealed with respect thereto and having a radially projecting coupling piece provided with a radial coolant bore, further including a carrier piece connectable to a stationary machine part, in particular the headstock, a holder adjustable in the carrier piece parallel to the axis of the boring tool, turnable about its axis of adjustment and lockable in position, and a coupling head which is radially adjustable on the holder, is provided with a radially extending outlet bore and which on rotation of the cutting tool can be coupled automatically with the coupling piece with the interposition of sealing means.

In a known arrangement of this kind (German Offenlegungsschrift No. 31 09 543), the carrier piece is in the form of a carrier ring which surrounds the spindle of the machine tool concentrically and is fixed to the headstock by a plurality of bolts. The problem consists in that there are machine tools, in particular universal working machines, of very different designs and tapped holes on the headstock may be arranged at different diameters and at different intervals. In addition, different distances arise between the plane of fixing to the headstock and the actual position of the coolant ring. For these reasons, it has been necessary to make a special carrier ring or the like for practically every individual machine tool. To this end, the constructional dimensions of the headstock have frequently had to be determined at the premises of the user of the machine tool, since as a rule the user does not possess any working drawings of the machine tool. This involves a considerable expenditure of work and time.

Therefore, a goal underlying the invention is to provide an arrangement of the kind mentioned at the beginning for supplying coolant to rotating cutting tools for metal machining, in particular boring tools provided with coolant ducts, wherein the carrier piece is so universally adjustable with respect to the headstock that the arrangement can be attached without alterations in design to many different machine tools. As a further development of the invention, the cooperation of the coupling head and coupling piece is also to be improved.

SUMMARY OF THE INVENTION

The problem underlying the invention is solved by providing on the carrier piece two intermediate parts arranged at a distance from one another, each of which is swingable at one end with respect to the carrier piece about an axis extending parallel to the boring tool axis, is slidable in a plane extending perpendicular to the boring tool axis, and can be clamped with respect to the carrier piece, and each of which has at its other end a bore extending parallel to the boring tool axis for a fixing bolt which can be screwed into the stationary machine part.

Due to the provision of intermediate parts which can both be swung with respect to the carrier piece and are slidable in a plane extending radially with respect to the boring tool axis, the arrangement can now be mounted on many different machine tools without any change in design. The intermediate parts can be slid and swung with respect to the carrier piece, so that their ends provided with the bores can be brought into coincidence with internal threads in the headstock. In this process, it does not matter what radial distance the internal threads have from the axis of the spindle and at what mutual distance they are arranged. By tightening the fixing bolt and clamping bolts with which the intermediate parts are connected to the carrier piece, a secure connection can be produced between the carrier piece and the headstock after adjustment of the coupling head with respect to the coupling piece. The mounting of the arrangement is substantially simplified in this way.

A further simplification of the mounting of the arrangement and an improvement in the sealing action between the coupling piece and the coupling head can be obtained in that the coupling piece has a sealing surface extending substantially tangentially to the coolant ring and surrounding the radial coolant bore, an elastic packing is arranged concentrically with the outlet bore at the free end of the coupling head which faces the coolant ring, and an abutment projecting radially above the sealing surface and cooperating with the free end of the coupling head is provided on the coupling piece.

BRIEF DESCRIPTION OF THE DRAWINGS

The invention is described in detail hereinafter with reference to an embodiment shown in the drawings. In the drawings:

FIG. 1a is a partial side view of the arrangement with a mounting post;

FIGS. 4 to 6 show various possibilities of mounting the arrangement;

DETAILED DESCRIPTION

Figure 1:
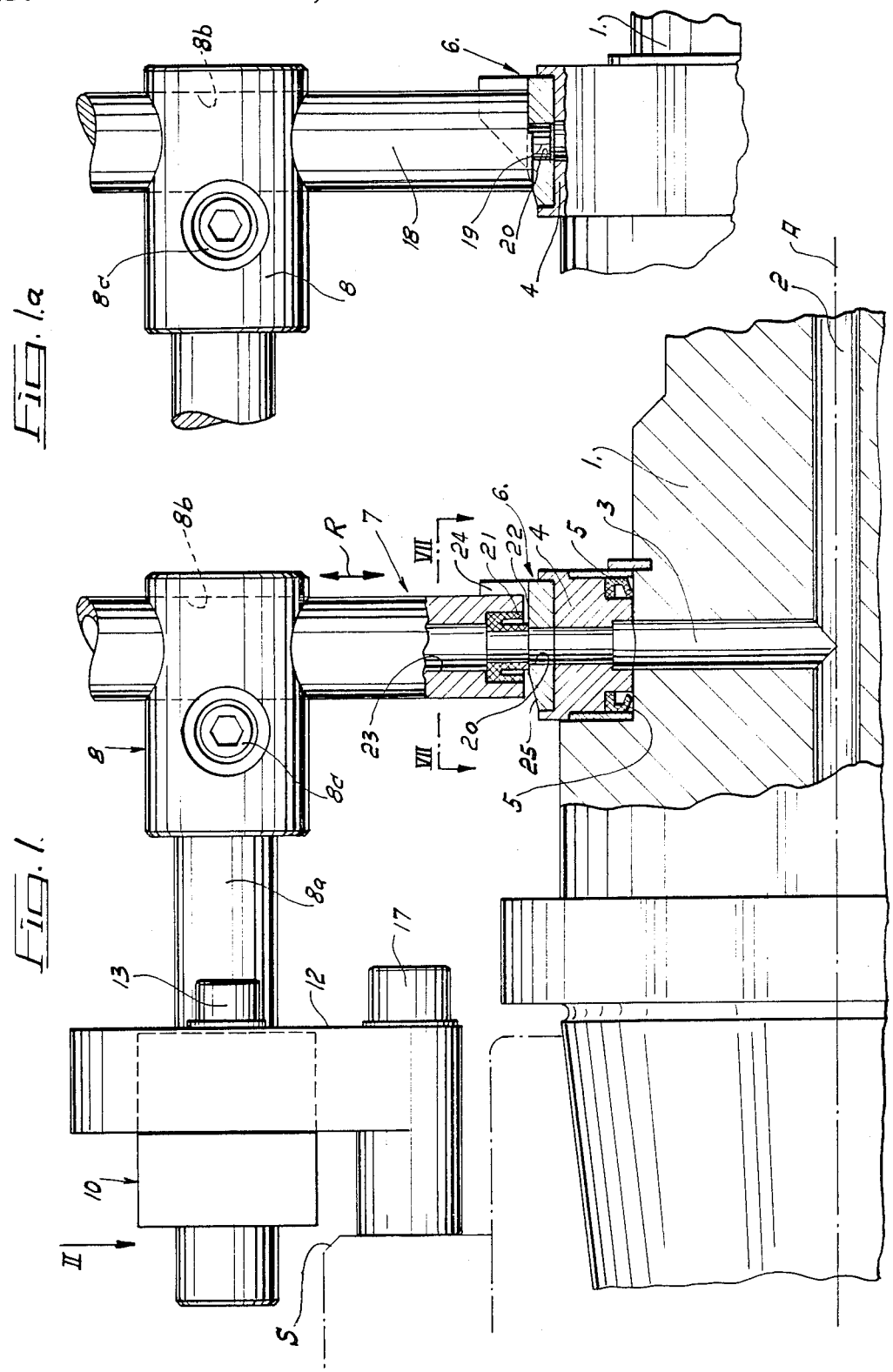
FIG. 1 is a side view of the arrangement with a rotating cutting tool, partly longitudinal section.
Figure 2:
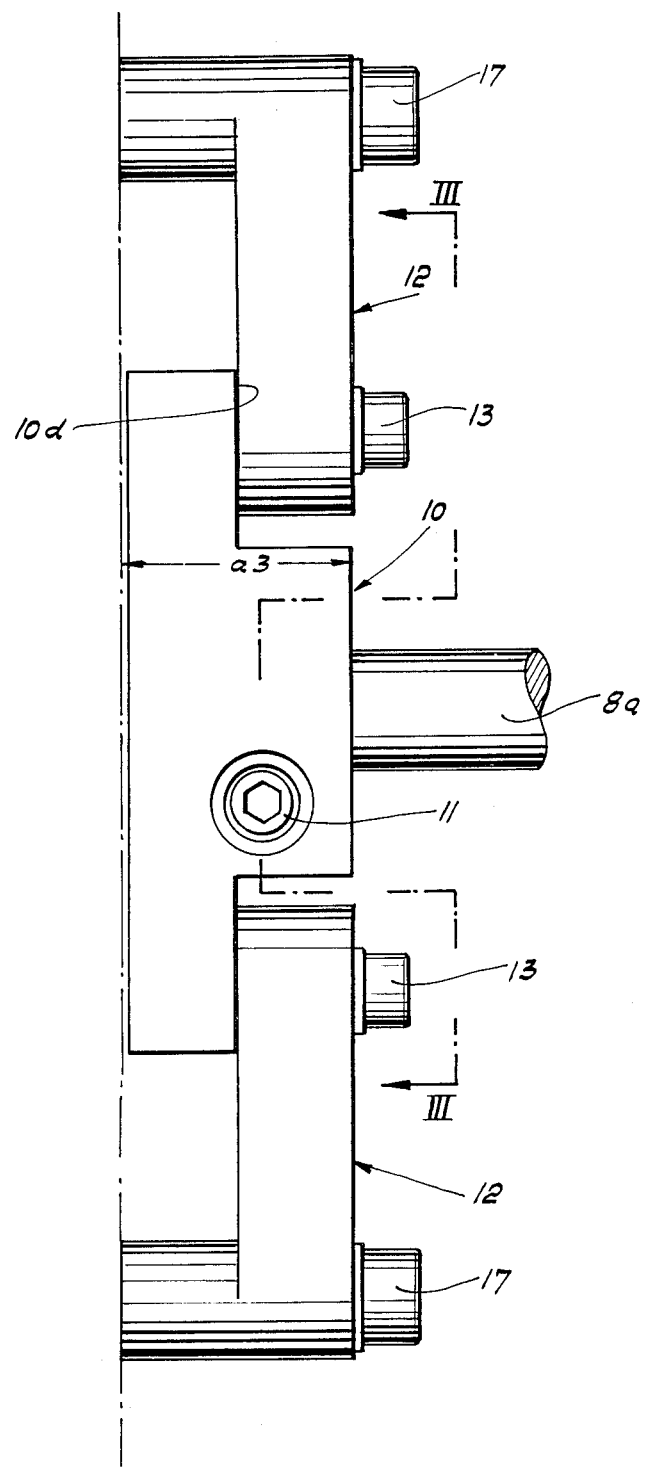
FIG. 2 is a plan view in the direction II of FIG. 1.

In the drawing, the reference numeral 1 designates the shank of a boring tool which has a central coolant bore 2 and a radial coolant bore 3 in communication with this bore. In the region of the radial coolant bore 3, a coolant ring 4 is rotatably mounted on the shank 1 and is sealed with respect thereto by packings 5. The coolant ring 4 carries a radially projecting coupling piece 6.

A coupling head 7 cooperates with the coupling piece 6 and is radially adjustable in a holder 8 in the direction R with respect to the boring tool axis A and can be clamped in the adjusted position by means of the clamping device 8c. The holder 8 has a cylindrical shaft 8a extending parallel to the boring tool axis. This shaft 8a is mounted to be slidable and turnable about its axis in a bore 9 (FIG. 4) extending parallel to the boring tool axis A in the carrier piece 10 and can be fixed in position by means of the clamping device 11.

Two similarly formed intermediate parts 12 are secured to the carrier piece 10 by means of the clamping bolts 13, which are arranged parallel to the boring tool axis A and are screwed into suitably arranged threads 14 in the carrier piece 10.

The carrier piece 10 is advantageously substantially T-shaped, the threads 14 being arranged at the two opposite ends of the cross-part or flange 10a. In the stem or leg 10b of the carrier piece 10 is the longitudinal bore 9 for the holder shaft 8a. The flange 10a of the carrier piece 10 has, on two opposite sides, plane abutment surfaces 10c and 10d for the intermediate parts 12 extending perpendicularly to the boring tool axis A.

Each intermediate part 12 has at one end 12a a longitudinal slot 15 and at its other end 12b a bore 16 for a fixing bolt 17, the bore extending parallel to the boring tool axis A. The intermediate part can be fixed to the headstock S of the machine tool with the fixing bolt 17. The slot 15 extends radially with respect to the bore 16 and moreover parallel to the boring tool axis A.

Each intermediate part 12 has with advantage on one side at its other end 12b an extension 12c extending coaxially with the bore 16 and through which the bore 16 likewise extends. This extension 12c increases the number of possibilities of mounting.

For mounting and adjusting the carrier piece 10, the intermediate parts 12 and the holder 8, there is suitably provided a mounting post or pin 18 (FIG. 1a) which can be inserted in the bore 8b of the holder 8 in place of the coupling head 7. The mounting post 18 carries at one end a stud 19 which fits into a radial coolant bore 20 in the coupling piece 6.

As can be established by comparison of FIGS. 1, 4, 5 and 6 with one another, the intermediate parts 12 can be fixed with the clamping bolts 13 either to the abutment surfaces 10c or the abutment surfaces 10d of the carrier piece 10. When this is done, they can be mounted in two different positions, namely either so that their extensions 12c point towards the headstock S or are directed away from it. Depending on how the intermediate parts 12 are mounted on the carrier piece 10, different distances a1 to a4 can be adjusted between the fixing surface on the headstock S and the front face 10e of the carrier piece. In this way, the carrier piece can be mounted in different positions in the direction of the boring tool axis A. Another possibility of adjustment in the direction of the boring tool axis A is provided by shifting the holder shaft 8a in the longitudinal bore 9. Further possibilities of mounting the carrier piece are obtained by turning the carrier piece around so that its front face 10e is directed towards the headstock.

Figure 3:
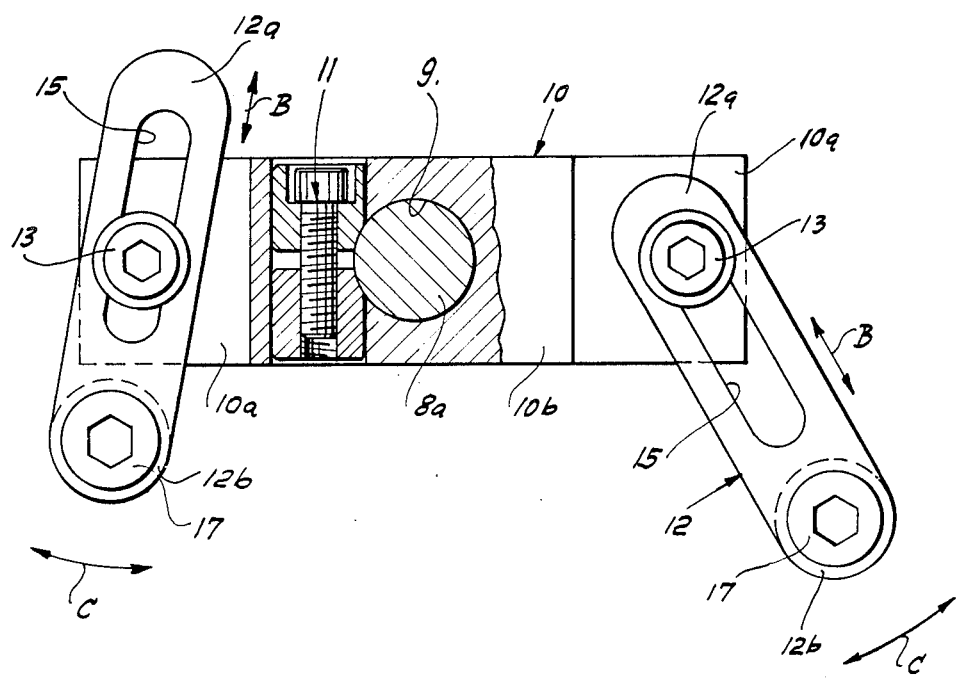
FIG. 3 is a cross-section on the line III—III of FIG. 2.

It can be seen by reference to FIG. 3 that the intermediate parts 12 can not only be slid in the direction B of their slots 15, but can also be swung about the axes of the clamping bolts 13 in the direction C. Because of this, a multiplicity of possibilities of adjustment and mounting are obtained for the intermediate parts.

The mounting of the arrangement hereinbefore described takes place in the following manner:

A boring tool 1 provided with the coolant ring 4 is inserted in the spindle of a machine tool, for example a universal working machine. Opposite the side where a tool changing device is provided in this universal working machine, that is where there is no obstacle to the same, two suitable threaded holes are selected on the headstock and the two intermediate parts 12 are first bolted loosely thereto with the fixing bolts 17. The carrier piece 10 is then connected to the intermediate parts 12 by means of the clamping bolts 13. Mounting may also be effected by already connecting the intermediate parts 12 to the carrier piece 10 before they are fixed to the headstock. The holder shaft 8a is then inserted in the longitudinal bore 9 and lightly clamped. It is axially slidable and rotatable therein, so that the mounting post 18 inserted in the holder 8 instead of the coupling head 7 can be introduced with its stud 19 without forcing into the radial coolant bore 20 of the coupling piece 6. In this simple way, the holder is correctly adjusted. The fixing bolts 17, the clamping bolts 13 and the clamping device 11 can now be tightened. After this has been carried out, the coupling head 7 is inserted in the bore 8b of the holder 8 in place of the mounting post 18 and the coupling head 7 is shifted until its packing 21 bears with a light pressure against the sealing surface 22 of the coupling piece 6. The clamping device 8c can then also be tightened and the mounting process is ended.

Figure 7:
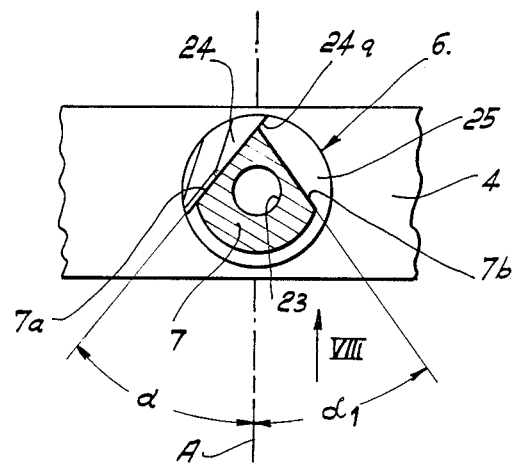
FIG. 7 is a section on the line VII—VII of FIG. 1.
Figure 8:
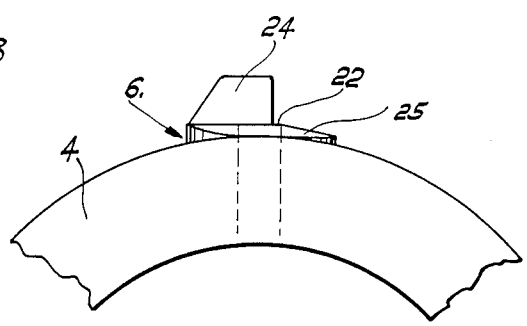
FIG. 8 is a view of the coolant ring and the coupling piece by themselves in the direction VIII of FIG. 7.

As is apparent from FIGS. 1, 7 and 8, the coupling piece 6 has a sealing surface 22 extending substantially tangentially to the coolant ring 4 and surrounding the radial coolant bore 20. The elastic packing 21 is arranged at the free end of the coupling head 7 facing the coolant ring 4 concentrically with the outlet bore 23. Moreover, an abutment 24 projecting above the sealing surface 22 is provided on the coupling piece 6 and cooperates with the free end of the coupling head 7. Adjoining the tangential sealing surface 22 on the outside is an inclined surface 25 sloping towards the periphery of the coolant ring 4.

It is apparent from FIG. 7 that the abutment surface 24a of the abutment 24 extends at an acute angle α to the boring tool axis A. This acute angle may be, for example, 45°. The free end of the coupling head 7 has an abutment surface 7a extending at the same acute angle α to the boring tool axis A and a deflecting surface 7b extending at the opposite acute angle α1 to the boring tool axis A.

The boring tool 1 is gripped by an automatic tool changing device and inserted in the spindle of the machine tool. In this process, the coupling piece 6 may be in any angular position of rotation with respect to the coupling head 7. If, by chance, it is in the region of the coupling head 7, then on the axial movement of the boring tool 1, during insertion, the coupling head 7 comes into contact with the abutment 24 either at its abutment surface 7a or at its deflecting surface 7b. If the abutment surface 7a touches the abutment surface 24a of the abutment, connection is established directly between the coupling head 7 and the coupling piece 6. If the deflecting surface 7b touches the abutment 24 at its side remote from the abutment surface 24a, the coolant ring is slightly turned and the deflecting surface 7b then bears against the outside of the abutment 24. If this is the case or if the coupling piece 6 is located in any other angular position of rotation, then during the rotating movement of the boring tool 1 the coolant ring is rotated at the same time in consequence of the friction between the sealing lips 5 and the shank 1 until the abutment surface 24a comes to rest against the abutment surface 7a. The packing 21 is moreover continuously compressed by the inclined surface 25 until it comes to rest on the tangentially extending sealing surface 22. A fluid-tight connection is thereby established between the coupling head 7 and the coupling piece 6.

The embodiments of the invention in which an exclusive property or privilege is claimed are defined as follows:

1. In an apparatus for supplying a fluid coolant to a cutting tool which is supported for rotation about a tool axis, which has a coolant channel therein, and which has a coolant ring rotatably supported on a shank thereof for movement about said tool axis relative to said tool, said coolant ring having sealing means which engages said tool shank and effects a seal between said tool shank and said coolant ring and having a radially projecting coupling piece which has a coolant bore extending radially inwardly thereinto; said apparatus further including a carrier piece supported on a stationary machine part, a holder which is supported on said carrier piece for movement generally parallel to said tool axis and for rotation about an adjusting axis, means for releasably clamping said holder in a selected position with respect to said carrier piece, and a coupling head which is supported on said holder for movement generally radially of said tool axis and has a radially extending outlet bore, rotation of said cutting tool when said coupling piece and coupling head are free of engagement causing said coolant ring to rotate with said cutting tool until said coupling piece and coupling head are in a position of sealing engagement in which said coolant bore and said outlet bore are in fluid communication; the improvement comprising: two spaced intermediate pieces which each have at one end an extension which projects outwardly in a direction substantially parallel to said tool axis, a bore therethrough which extends through said extension thereon substantially parallel to said tool axis, and a slot which extends radially with respect to said bore; two fastening bolts which each extend substantially parallel to said tool axis through the bore in a respective said intermediate piece and engage a respective threaded opening provided in said stationary machine part; and two clamping bolts which each extend parallel to said tool axis through the slot in a respective said intermediate piece and engage a respective threaded opening provided in said carrier piece; wherein said carrier piece is generally T-shaped and has a stem and a cross-part, said carrier piece having said threaded openings for said clamping bolts at opposite ends of said cross-part and having in said stem a bore which axially slidably receives a shaft of said holder which extends parallel to said tool axis.

2. The apparatus according to claim 1, including mounting means for facilitating positional adjustment of said carrier piece, said intermediate pieces and said holder, said mounting means including a mounting post which can be movably supported on said holder in place of said coupling head and which has at one end a stud receivable in said coolant bore in said coupling piece.

3. The apparatus according to claim 1, wherein said coupling piece has thereon a sealing surface which extends generally tangentially of said coolant ring and through which said coolant bore opens, wherein said coupling head includes an elastic packing which concentrically encircles said outlet bore at an end of said coupling head which faces said coolant ring, and wherein said coupling piece has an abutment thereon which projects radially outwardly past said sealing surface thereon and can engage said end of said coupling head.

4. The apparatus according to claim 3, wherein said coupling piece has, adjacent said tangential sealing surface, an inclined surface which extends radially inwardly and away from said sealing surface.

5. The apparatus according to claim 3, wherein said abutment has thereon a first abutment surface which extends at a first acute angle with respect to said tool axis, wherein said end of said coupling head has thereon a second abutment surface which extends at said first acute angle with respect to said tool axis and can engage said first abutment surface, and wherein said end of said coupling head also has thereon a deflecting surface which extends at a second acute angle with respect to said tool axis and which extends with respect to said second abutment surface at an angle which is equal to the sum of said first and second acute angles.

6. The apparatus according to claim 5, wherein said first and second abutment surfaces and said deflecting surface each extend substantially parallel to the direction of movement of said coupling head relative to said holder, wherein said second abutment surface and said deflecting surface on said coupling head converge with respect to each other in a direction parallel to said tool axis and toward said stationary machine part, wherein said first abutment surface and said deflecting surface face in a direction of rotation of said cutting tool, and wherein said second abutment surface faces in a direction opposite said direction of rotation of said cutting tool.

7. The apparatus according to claim 1, wherein said carrier piece and said intermediate pieces are oriented so that said extensions on said intermediate pieces project in a first axial direction toward said stationary machine part, said stem of said carrier piece projects outwardly from said cross-part thereof in a second axial direction opposite said first axial direction, and said intermediate pieces each contact said cross-part of said carrier piece on a side of said cross-part which faces in said second axial direction.

8. The apparatus according to claim 1, wherein said carrier piece and said intermediate pieces are oriented so that said extensions on said intermediate pieces project in a first axial direction toward said stationary machine part, said stem of said carrier piece projects outwardly from said cross-part thereof in a second axial direction opposite said first axial direction, and said cross-part of said carrier piece contacts each said intermediate piece on a side of the intermediate piece which faces in said second axial direction.

9. The apparatus according to claim 1, wherein said carrier piece and said intermediate pieces are oriented so that said extensions on said intermediate pieces project therefrom in an axial direction away from said stationary machine part, said stem of said carrier piece projects outwardly from said cross-part thereof in said axial direction away from said machine part, and said cross-part of said carrier piece contacts each said intermediate piece on a side of the intermediate piece which faces in said axial direction.

10. The apparatus according to claim 1, wherein said carrier piece and said intermediate pieces are oriented so that said extensions on said intermediate pieces project therefrom in an axial direction away from said stationary machine part, said stem of said carrier piece projects outwardly from said cross-part thereof in said axial direction, and said intermediate pieces each contact said cross-part of said carrier piece on a side cross-part which faces in said axial direction.

11. The apparatus according to claim 1, wherein said sealing means frictionally engages said shaft of said cutting tool, and wherein said adjusting axis is substantially parallel to said tool axis.

* * * * *